United States Patent [19]

Ohtsuki et al.

[11] 4,118,660
[45] Oct. 3, 1978

[54] AUTOMATIC MACHINING SYSTEM

[75] Inventors: Nobuo Ohtsuki; Toshio Hayashi; Akio Imai; Yoshio Takahashi; Noboru Hashimoto, all of Tokyo, Japan

[73] Assignee: Nippon Electric Company Ltd., Tokyo, Japan

[21] Appl. No.: 756,855

[22] Filed: Jan. 5, 1977

[30] Foreign Application Priority Data

Jan. 7, 1976 [JP] Japan .................. 51-1731

[51] Int. Cl.² ............................ G05B 19/24
[52] U.S. Cl. ................................... 318/571
[58] Field of Search ......................... 318/571

[56] References Cited

U.S. PATENT DOCUMENTS

| | | | |
|---|---|---|---|
| 3,573,588 | 4/1971 | Geyer et al. | 318/571 |
| 3,759,139 | 9/1973 | Whetham | 318/571 |
| 3,818,334 | 6/1974 | Rosenberg | 318/571 X |
| 3,846,689 | 11/1974 | Possati | 318/571 |
| 3,896,360 | 7/1975 | Meyer et al. | 318/571 |
| 3,975,667 | 8/1976 | Bory et al. | 318/571 |

Primary Examiner—B. Dobeck
Attorney, Agent, or Firm—Ostrolenk, Faber, Gerb & Soffen

[57] ABSTRACT

An automatic machining system incorporating all the features of a numerically controlled type machine while eliminating the need for paper tapes. The tool receiving head incorporates means for identifying the moment of contact between tool and work piece, avoiding the need for inputting start position data. Motion control and drive means are provided for X, Y and Z head movement. The novel design provides drilling or punching by insertion of the proper tool in a head adapted to receive either tool.

Visual displays provide step by step directions and allow for selection of the machining operation and sequential execution of the machining steps in accordance with inputted data requested by the display.

The punching tool operates automatically simply under control of Z axis movement.

2 Claims, 13 Drawing Figures

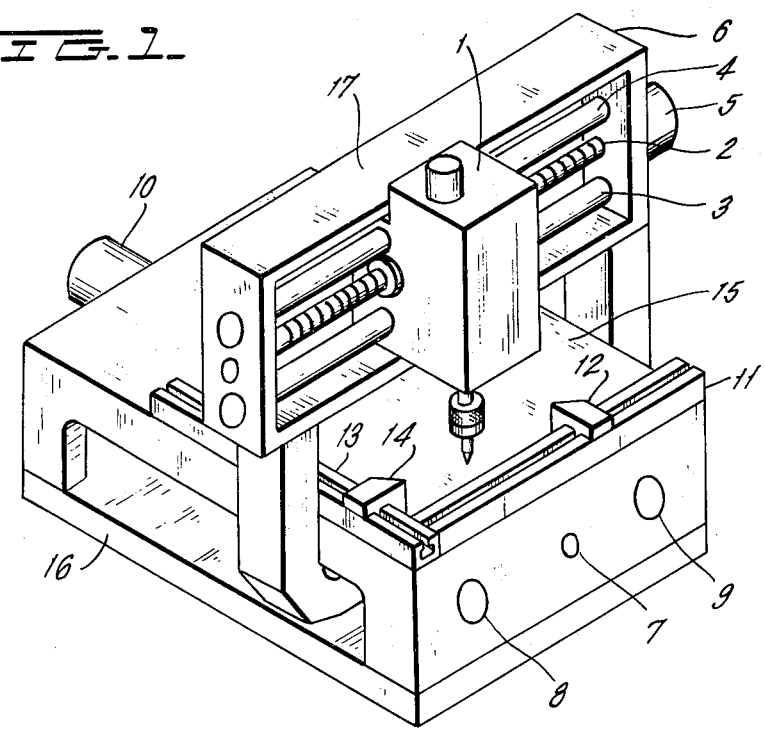

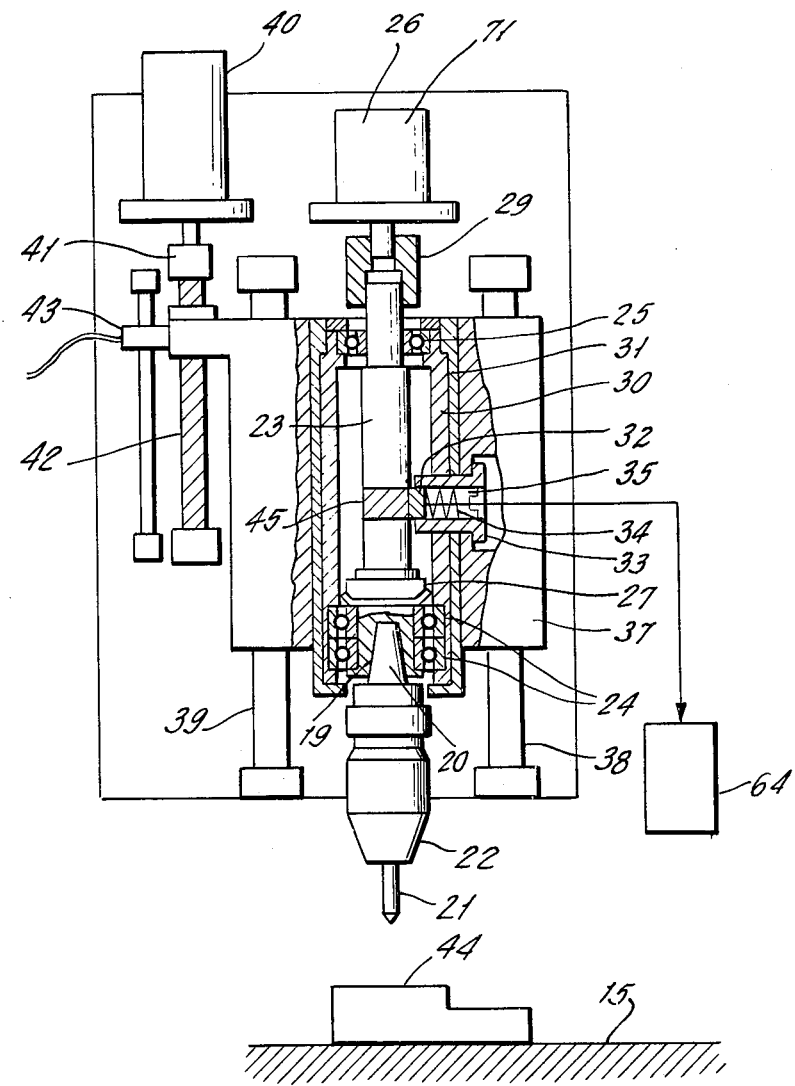

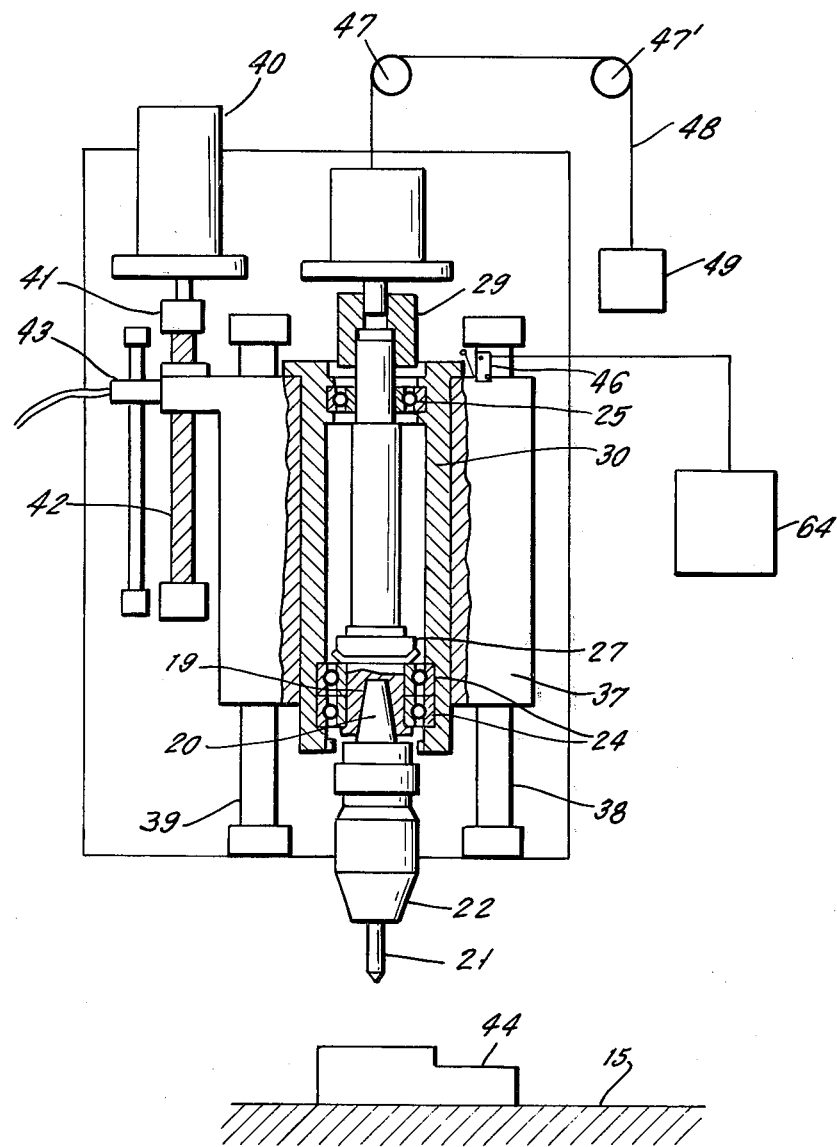

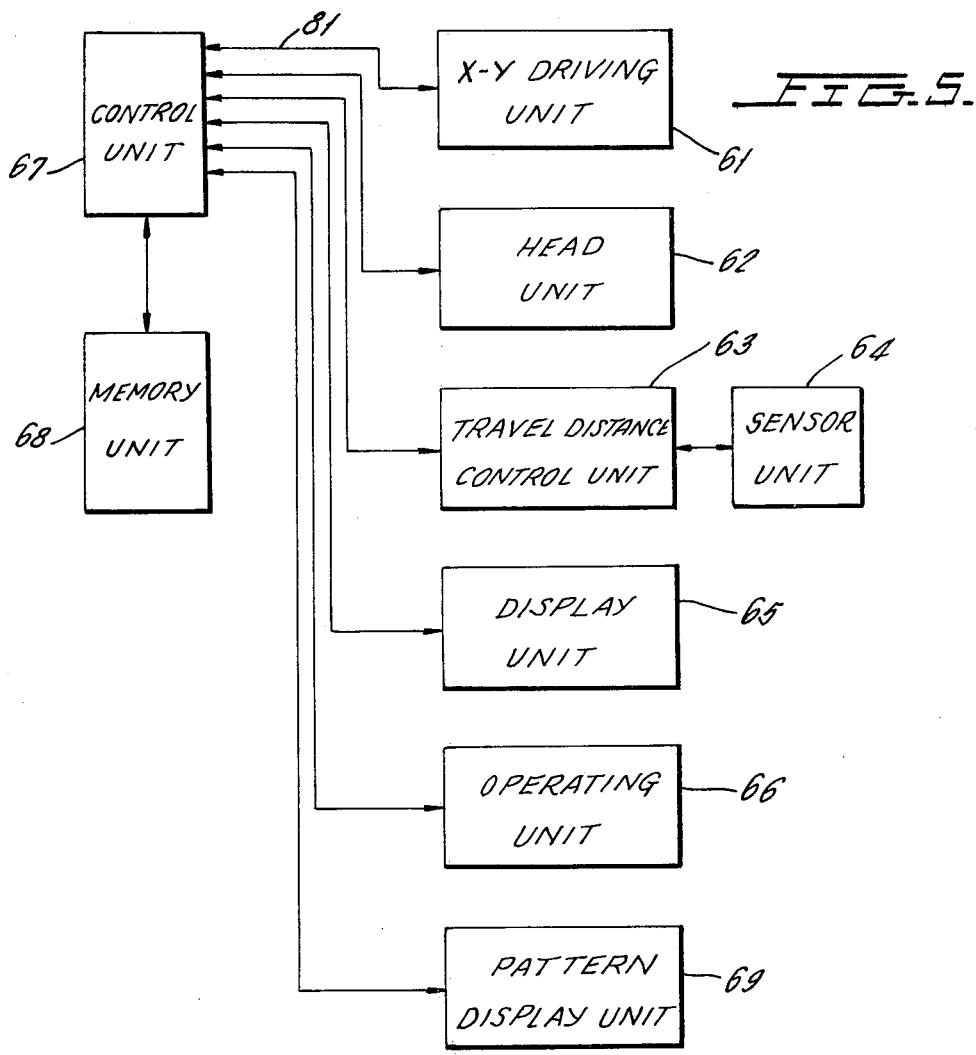
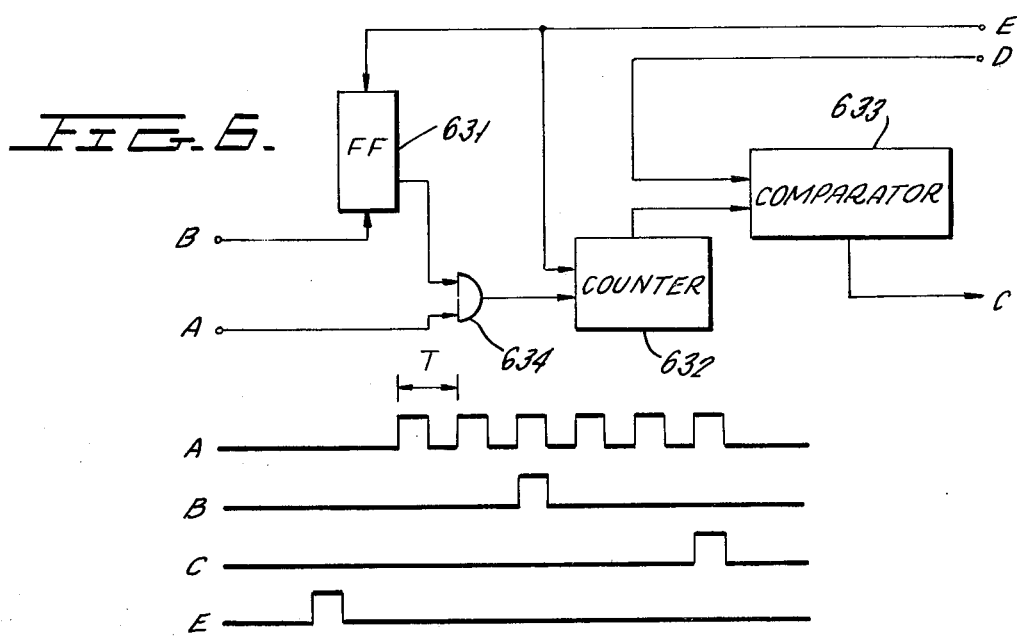

AUTOMATIC MACHINING SYSTEM

BACKGROUND OF THE INVENTION

The invention relates to an automatic machining system, and particularly to an automatic machining system which accomplishes scribing, punching and drilling in production of machine parts at instructions given from an operating unit, based on indications on a display unit.

Whereas scribing, punching and drilling take place in the preparatory and finishing stages of machining, scribing and punching are usually accomplished by hand, and drilling, with a manually operated drilling machine. Although numerically controlled (NC) drilling machines have also become available over the recent years, manually operated drilling machines have been predominantly used except in achieving particularly complex operations or in working on pieces which require many drilling operations.

However, manually operated drilling machines have shortcomings such as inability to achieve accurate positioning and need for separate positioning operations even in repeated drilling in the same position. The predominant use, as stated above, of manually operated drilling machines in spite of these disadvantages is attributable to the circumstances described below, in addition to the large cost of NC drilling machines.

The usual procedure of giving an operating instruction to an NC system is for the operator or programmer to prepare a punched (paper) tape in accordance with the machining sequence, and have the machine tool read the so prepared paper tape to receive the instruction and machine the workpiece accordingly. However, when a small number of workpieces are to be machined, the intervention of the paper tape results in inconveniences such as the time required for preparation of the tape being longer than the time required for actual machining and the troubles of storing paper tapes and choosing the desired from the group of tapers. Moreover, when a conventional NC drilling machine is used for drilling operations, every time the distance between the drill and the workpiece varies, even though the drilling depth is constant, the distance from the base point has to be calculated and the drill-workpiece distance specified accordingly. Furthermore, although scribing, punching and drilling are more often than not required in the same stage of processing and positioning along the X and Y axes is indispensable for every such operation, there is no machine available at present that can carry out all these operations by itself. A conventional automatic machining system incorporating an NC drilling unit of the aforementioned type is seen in "Planning for numerical control" of *MACHINERY and production engineering*, pp. 521–529 by Earl J. Donelan, Sept. 8, 1965.

OBJECT OF THE INVENTION

The object of the present invention is to provide an automatic machining system free from the above described shortcomings of conventional systems.

BRIEF DESCRIPTION OF THE INVENTION

The present automatic machining system is comprised of a head unit having a combined scribing/punching tool or drill chuck, a unit to position said tool or drill chuck in the direction of the Z axis and a revolution-driving unit to turn said drill in drilling a workpiece, a sensor subjected to pressure from said tool or drill according to the back component of force which said tool or drill receives from the workpiece when the tip of said tool or drill comes into contact with said workpiece, and generates an electric signal to detect said contact and senses the variation thereof, a travel distance control unit responsive to a detection signal from said sensor for controlling the travel distance of the tool or drill of said head unit in the Z axis direction in accordance with the requirement of the scribing, punching or drilling operation, an X-Y driving unit that moves and positions said head unit in the directions of the X and Y axes to vary the machining position of the head unit, means for securely fixing said workpiece on a work table, a memory unit to memorize various data, an operating unit which selects one of the scribing, punching and drilling functions for said head unit, chooses a working pattern and feeds said memory unit with machining data including the X and Y coordinates for moving said head unit and the external dimensions and drilling depth of the workpiece, a display unit on whose screen the picture varies with the working condition of said operating unit and the machining data fed from said operating unit to said memory unit as well as the operating instruction and the kinds of data such as said X and Y coordinates and the radius to be next given as input to said operating unit, are indicated, a pattern display unit on which the respective working patterns corresponding to the modes of said scribing, punching and drilling, and all the symbols in which the machining data to be fed from the operating unit to said memory unit are to be indicated are displayed in advance and the working pattern selected by the operating unit is separately indicated as express instruction to an operator, and a control unit for controlling each of the above-mentioned means in accordance with said machining data input from said operating unit to the memory unit.

BRIEF DESCRIPTION OF THE FIGURES

The invention will be described in further detail below with reference to the accompanying drawings in which:

FIG. 1 shows an oblique view of the mechanical part of the automatic machining system of the invention;

FIGS. 2A and 2B show sectional views of the head unit equipped with a drill chuck;

FIGS. 3 and 4 show sectional views of the combined scribing/punching tool respectively before and after it is subjected to pressure;

FIG. 5 shows a block diagram of one embodiment of the invention;

FIG. 6 illustrates the functioning of a travel distance control unit;

Each of FIGS. 8, 9, 10 and 11 shows an example of representation on a display unit 65 of FIG. 5.

DETAILED DESCRIPTION OF THE INVENTION

Figure 7:
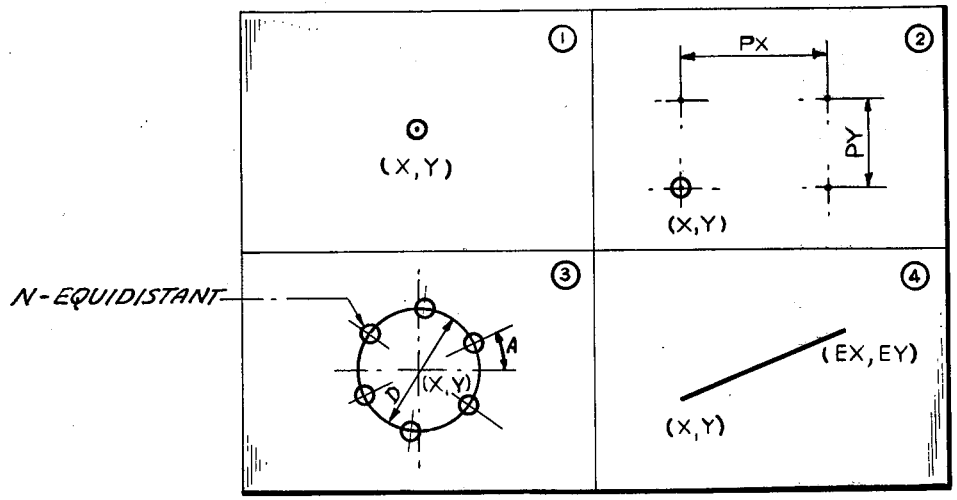
FIG. 7 consists of a brief diagram of a working pattern and diagrams indicating symbols to be shown on a pattern display unit 69 of FIG. 5.
Figure 8:
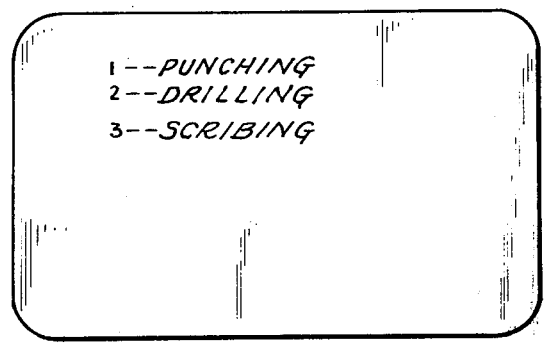
Figure 9:
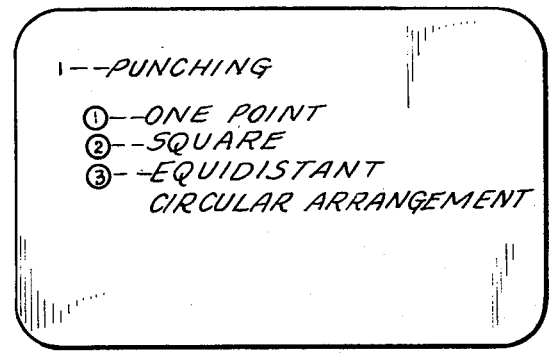

FIG. 1 shows an oblique view of the mechanical part of the automatic machining system of the invention. The driving position of a head unit 1 in the direction of the X axis is determined by a driving motor 5 and a driving screw 2, guided by guide shafts 3 and 4 of an X-Y driving unit 17. The X-Y driving unit 17 is positioned in the Y axis direction, guided by guide shafts 8 and 9 and corresponding to the motions of a driving motor 10 and a driving screw 7. A workpiece 44 (FIG. 2A) is securely held on a table 15 by X-Y standards 11 and 13 fixed at a right angle with each other of the table 15 and by workpiece holding cursors 12 and 14 which press the workpiece 44 against said standards 11 and 13. Reference number 16 represents the base.

FIGS. 2A and 2B show sectional views of the head unit 1 of FIG. 1, provided with a drill chuck 22.

In FIG. 2A, the drill chuck 22, which is equipped with a drill 21, is supported by bearings 24 and 25 at the lower and upper ends, respectively, of a bearing-supporting inner case 30 and is fastened with a nut 27, and receives transmission of the rotary drive from the motor 26 of a rotary-driving unit 71 through a coupling 29 and a conical hole 19 at the lower end of a revolution shaft 23. Driving of a head body 37 in the Z axis direction (FIG. 1) is achieved by the force originating from a motor 40 which drives transmission screw 42 through a coupling 41. The head 37 is guided by guide shafts 38 and 39. In FIG. 2A, said bearing-supporting inner case 30 and said head body 37 are integrally joined through an intermediate case 31 made of electrically insulating material. Onto said head body 37 is fixed an electrical contact case 33 made of electrically insulating material. The electrical contact 32 is biased into engagement with a piezo-electric element 45 provided on the rotatable shaft 23 by the suitable pressure of a spring 34 and an adjusting screw 35 built into said electrical contact case 33. Said piezo-electric element 45, being fixed to part of said rotatable shaft 23, generates electric signals resulting from forces applied in the Z axis direction (FIG. 1) and undergoes voltage variation caused by the back component of force from said rotatable shaft 23. This voltage variation is sensed by a sensor unit 64 consisting of a level discriminator and other components, and the contact between the workpiece 44 and the drill 21 is thereby detected.

FIG. 2B illustrates an instance in which a microswitch 46 is used in place of the piezo-electric element 45 of FIG. 2A for detection of contact. In FIG. 2B, the bearing-supporting inner case 30 is so fitted that it can slide against the head body 37 for only a short distance, and a weight 49, which is slightly lighter than the combined weight of all the mechanical parts said bearing-supporting inner case 30 is equipped with, is supported by blocks 47 and 47' and a wire 48. Consequently, the inner case 30 travels according to the back component of force the workpiece 44 receives from the drill 21 as a result of the contact between the workpiece 44 and the drill 21. In the absence of said back component of force, the inner case 30 is situated at its bottom-most position, in the Z axis direction (FIG. 1), relative to head body 37. The microswitch 46 for detecting the travel of the inner case 30 relative to said head body 37 is provided at the top of said head body 37, and a contact of the microswitch 46 is connected to said sensor unit 64. If, for instance, the workpiece 44 comes into contact with the drill 21, due to the downward movement of head 37, the back component of force the workpiece 44 receives from the drill 21 will cause said inner case 30 to slightly rise in the Z axis direction (FIG. 1) and press the actuator of said microswitch 46, whose contacts are thereby closed. Since a voltage is applied in advance between the contacts of said microswitch 46, closure of said contacts causes an electric current to flow to said sensor unit 64, and the contact between the workpiece 44 and the drill 21 is thereby detected.

In FIGS. 2A and 2B, a position-finding element 43 (an element generating pulse signals at regular intervals T, e.g., (Magnescale (trade name) manufactured and distributed by Sony Magnescale Co., Ltd.) attached to the head body 37 and the sensor unit 64 are separately connected to a travel distance control unit 63 (FIG. 5).

FIGS. 3 and 4 show sectional views of a combined scribing/punching tool 18 respectively before and after it is subjected to pressure (after punching). This tool 18 consists of: an exterior taper 20, at its top end, which taper fits into the conical hole 19 in the shaft 23 shown in FIG. 2A; a body 51 having an internal tapered portion 56; a needle 50 which, under pressure from a small spring 54, can slide within the body 51 and has a sharply pointed conical tip for scribing and/or punching; a hammer 57 which, under pressure from a large spring 55, can slide within the body 51 and has a hole 59 matching the needle 50, and a stopper member 52 which, when engaged with a notch 58 in the middle of the hammer 57, is kept pressed against the inner wall of the tapered part 56 of the body 51 by a leaf spring 53 and has a hole 60 axially aligned with the needle 50.

In FIG. 5 which shows a block diagram of one embodiment of the invention, an automatic machining system of the invention consists of: a head unit 62 (corresponding to the head unit 1 of FIG. 1); an X-Y driving unit 61 (corresponding to the X-Y driving unit 17 of FIG. 1) which drives and positions, by means of the driving motors 5 and 10 of FIG. 1, said head unit 62 in the X axis and Y axis directions; the sensor unit 64 which detects contact of the tip of said head unit 62 with the workpiece 44; the travel distance control unit 63 including the position-finding element 43 (FIGS. 2A and 2B) which serves to determine the travel distance of said head unit 62 for scribing, punching or drilling after the surface of the workpiece has been sensed by the sensor unit 64; an operating unit 66; a display unit 65; a memory unit 68; a pattern display unit 69; and a control unit 67 which controls various means referred to above in accordance with the machining data fed from said operating unit 66 to said memory unit 68. In FIG. 5, reference number 81 represents signal lines between blocks.

In FIG. 6, which illustrates the functioning of the travel distance control unit 63, letter A refers to the pulse signals occuring at regular intervals T and derived from the position-finding element 43, and letter B represents the detection signal from the sensor unit 64, which sets a flip-flop 631 contained within the travel distance control unit 63. Only when this setting signal coincides with one of said pulse signals A at regular intervals T, does AND gate 634 open to supply the travel distance control datum (pulse) to a counter 632. A travel stop signal represented by letter C is developed by a comparator 633 when travel distance datum D from the control unit 67 and said travel distance control datum from the counter 632 within the control unit 63 are compared by the comparator 633 and found equal to each other. The travel distance control signal (S63-B of FIG. 12), represented by letter E, of the travel distance control unit 63 is the resetting signal (S63-A of FIG. 12) for the flip-flop 631 and the counter 632 of control unit 67.

FIG. 7 shows a group of simplified diagrams each representing a working pattern to be prepared for scribing, punching or drilling as the case may be and to be displayed by the pattern display unit 69 of FIG. 5, and diagrams of symbols to be shown by said pattern display unit 69 to indicate machining data to be fed from said operating unit 66 to the memory unit 68.

Each of FIGS. 8, 9, 10 and 11 shows an example of representation on the display unit 65 of FIG. 5.

Figure 12:
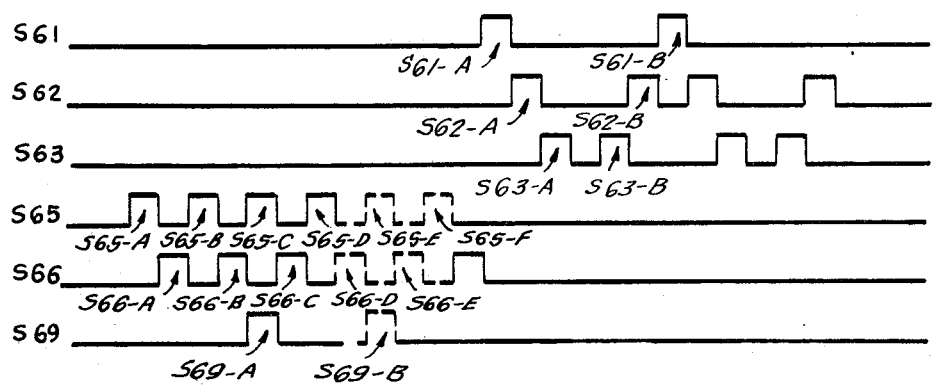
FIG. 12 illustrates the control timing relationship between a control unit 67 and each means by way of a signal line 81 of FIG. 5.

FIG. 12 illustrates the control timing relationship between the control unit 67 and each means by way of the signal line 81 of FIG. 5.

The present automatic machining system will be described in further detail below with reference to FIGS. 1 through 12.

First, the operator puts the workpiece 44 of FIG. 2A on the table 15 of FIG. 1, and, while pressing it against the X-Y standards 11 and 13, fastens the workpiece to the table 15 with the cursors 12 and 14. Then, the control unit 67 starts action in accordance with the information stored in advance in the memory unit 68 of FIG. 5, and issues a control signal to give, as the first phase of operation, a representation (FIG. 8) to indicate the choice of operation on the display unit 65 (S65-A of FIG. 12). On the basis of this representation, the type of operation, i.e., scribing, punching or drilling, to be applied to the workpiece 44 is selected by the operating unit 66 (S66-A of FIG. 12). Following this selection, the display unit 65 indicates, as the second phase, a list, in reference numbers and letters, of working patterns prepared at the instruction of the control unit 67 (S65-B of FIG. 12). If punching is selected in the first phase, a representation like FIG. 9 will appear on the display unit 65. Since, for each of the working patterns indicated in reference numbers on this display unit 65 in a list form, a brief diagram and symbols in which required machining data are to be indicated (e.g., D for diameter) are represented in advance on the pattern display unit 69 shown in FIG. 7, the representation on the display unit 65 and the display unit 69 can be contrasted to facilitate the choice by the operating unit 66 of the pattern of machining to be applied to the workpiece 44 (S66-B).

Figure 10:
Figure 11:

Upon completion of the choice of the required working pattern out of FIG. 7, the display unit 65, as the third phase, changes its representation to a list of symbols in which to indicate machining data (S65-C of FIG. 12) and the pattern display unit 69 distinguishes with lamps the brief diagram of the selected working pattern and the symbols for indication of the machining data from the remaining unselected patterns (S69-A of FIG. 12—If, in said second phase, the working pattern of "equidistance circular arrangement" is selected, the representation on the display unit 65 will look like FIG. 10). Next, as the representation on the display unit 65 (FIG. 10) is compared with the brief diagram of the working pattern and the symbols for indication of the machining data selected from the pattern display unit 69, and the machining data (S66-C) are successively fed from the operating unit 66 to the memory unit 68, the representation on the display unit 65 will eventually look like FIG. 11 (S65-D).

Whereas machining data are inputted to the memory unit 68 for machining in the third phase of the pattern selected in the first two phases, overlapping of another pattern on said working pattern, if desired, can be achieved as the fourth phase by giving an instruction from the operating unit 66 (S66-D) in the same procedure of selection as described with respect to the second phase (S65-E of FIG. 12). Next, as the fifth phase, entry of the machining data into the memory unit 68 (as described with regard to the third phase) for said additional working pattern can be accomplished through the operating unit 66 (S66-E) on the basis of the display unit 65 and the representation on the pattern display unit 69 (S69-B). Selection of the required working pattern or patterns (S65-F) and input to the memory unit 68 of relevant machining data are achieved in this manner.

The machining data input in said three or five phases are stored in the memory unit 68, converted by the control unit 67 into X and Y coordinates corresponding to the working pattern and used for developing action commands from the X-Y driving unit 61. In response to such an action command, the motor 5 (FIG. 1) for driving in the X axis direction and the motor 10 for drivng in the Y axis direction are set in motion (S61-A) to shift the head unit 1 to the initial machining position. Hereupon, in case of drilling, the drill 21 is rotated by the motor 26 (in case of scribing or punching, the motor 26 does not turn), the head body 37 is lowered by the motor 40 for driving in the Z axis direction, the transmission screw 22, etc. (S62-A), and the tip of the drill 21 then comes into contact with the workpiece 44. As illustrated in FIG. 2A, the contact with the workpiece 44 is detected by the sensor unit 64 as the back component of force, which the tip of the drill 21 receives from the workpiece 44, applies pressure on the piezo-electric element 45 provided on the rotatable shaft 23 to generate an electric signal and said signal is transmitted to the sensor unit 64 via the electric contact 32.

On the other hand in FIG. 2B, the contact with the workpiece 44 is detected by the sensor unit 64 as the back component of force, which the tip of the drill 21 receives from the workpiece 44, shifts for a slight distance the bearing-supporting inner case 30 which is provided in the head body 37 and can slide therein, the shift is sensed by the microswitch 46 provided on the head unit 1 and the electric signal from this microswitch 46 is transmitted to the sensor unit 64.

As referred to with letter A in FIG. 6, the position-finding element 43 (FIGS. 2A and 2B) generates pulse signals at regular intervals T. Upon receipt from the sensor unit 64 of a detection signal represented by letter B in FIG. 6, the travel distance control unit 63 generates a travel distance control signal, as represented by letter C, on the basis of the pulse signals from the element 43 at regular intervals T, and begins to control the travel distance of the head body 37 (FIGS. 2A and 2B). More specifically control unit 63, checking the datum on machining depth entered into the memory unit 68 through the operating unit 66, transmits a signal to the control unit 67 when the travel distance of the head unit 1, after making contact with the workpiece 44, reaches the required value (e.g., the drilling depth in the event of a drilling operation). There-upon, the control unit 67 applies a reversing signal to the driving motor 40 (S62-B). The head body 37 accordingly begins to rise, and upon completion of its upward travel the control unit 67 restarts control of the X-Y driving unit 17 until the next machining position is reached (S61-B), and accomplishes control in a manner similar to the aforementioned operations. When all the input machining data have been put into operation in this manner, the head unit 1 stops in the final machining position and the whole series of machining operations is completed.

Next, actions will be separately described for drilling, punching and scribing operations.

First in a drilling operation, as illustrated in FIG. 2A or 2B, the drill chuck 22 is fitted in advance by inserting the tapered portion 20 into the conical hole 19 at the lower end of shaft 23 in head unit 1 shown in FIG. 1. The operating unit 66 is then used to selectively represent the mode of operation as "drilling" on the screen of the display unit 65, and to enter (as described above) and store the machining data in due order in the memory unit 68. Under the control of the control unit 67 in accordance with these data, first the head unit 1 is positioned by the X-Y driving unit 17, and the head body 37 starts to descend, with the motor 26 in motion. Next, when the tip of the drill 21 comes into contact with the workpiece 44, the head body 37 travels in the Z axis direction under the control of the travel distance control unit 63 so that drilling to the required depth is achieved according to the machining data entered into the memory unit 68. After that, the head body 37 is lifted, and the drilling operation is completed.

Next in a punching operation, the combined scribing-/punching tool 18 illustrated in FIG. 3 is fitted in advance by inserting tapered portion 20 into the conical hole 19 at the lower end of the rotatable shaft 23 of the head unit 1 shown in FIG. 1. The operating unit 66 is then used to selectively represent the mode of operation as "punching" on the screen of the display unit 65, and the machining data are inputted to the memory unit 68 from the operating unit 66 to position the head unit 1 relative to the X and Y axes in the same manner as for said "drilling" operation. After that, the head body 37 begins to descend, with motor 26 deenergized. Next, as the tip 50a of the needle 50 comes into contact with the workpiece 44, the travel distance, after tip 50a engages workpiece 44, is controlled by the travel distance control unit 63. Thus, even after the tip 50a of the needle 50 has come into contact with the surface of the workpiece 44, the head body 37 continues to travel in the Z axis direction, and the needle 50, subjected to pressure by the small spring, rises within the body 51. During this process, the stopper member 52 provided under the hammer 57 is pressed by the leaf spring 53 against the inner wall of the taper part 56. Since at this time the needle 50 is not aligned with the hole 60 of the stopper pin 52 in axial center, the needle 50 is kept in contact with the bottom of the stopper member 52 when it rises compressing the spring 55 together with the stopper pin 52 and the hammer 57. As it rises, the stopper member 52 is pressed inwards by the effect of the internal tapered part 56, and when the member 52 is raised to a level where the hole 60 of the stopper pin 52 is aligned with the needle 50 in axial center, the needle 50 slides away from the bottom of the stopper member 52 and enters into the hole 60. As a result, the large spring 55 that has been compressed by the hammer 57 to accumulate repulsive energy is suddenly liberated by the alignement of member 52 and the upper end 50b of needle 50, to cause the hammer 57 to strike against the upper end 50b of needle 50 to apply a force suitable for the punching operation. Whereas the distance of travel between the contact with the workpiece 44 and the release of the punching force is predetermined, control for this purpose is accomplished by the travel distance control unit 63. After the punching action, the head body 37 is raised. As the head body 37 rises, the needle 50 move away from the workpiece 44, and simultaneously with the descent of the needle 50 relative to member 52 by the action of the small spring 54, the hammer 57 is lowered by the action of the large spring 55 and the stopper member 52 travels along the inner wall of the taper part 56 until it assumes the position it occupied before the application of pressure is resumed.

Further in a scribing operation, after the operating unit 66 is used as described above to selectively represented the mode of operation as "scribing" on the screen of the display unit 65, the machining data are entered from the operating unit 66 into the memory unit 68, and the head part 1 is positioned relative to the X and Y axes in the same manner as for said "drilling" or "punching" operation. After that, the head body 37 begins descending. Under the control of the travel distance control unit 63, the head body 37 descends for the distance between the position where the tip needle 50a comes into contact with the workpiece 44 and the position where the rising needle 50 reaches the bottom of the stopper member 52, i.e., the distance where the pressure of the small spring 54 alone is applied, and the driving motor 40 stops running. At this time the head body 37 is kept in the position where it has stopped after the descent and the head unit 1 is shifted relative to the X and Y axes by the X-Y driving unit 17 to achieve scribing. After the completion of this scribing operation, the head body 37 ascends. The scribing operation is thus completed.

Incidentally the memory unit 68, display unit 65, operating unit 66 and pattern display unit 69 which comprise the present invention are known components, and since specific configurations of these components themselves have no direct bearing on the essentials of the invention, they are not described in detail herein. Examples in which these known components are used include an AC grinding system referred to a "AN ADAPTIVE CONTROL SYSTEM OF GRINDING PROCESS" by Hideo Inoue et al. in the *Proceedings of The International Conference on Production Engineering, Part* 1 (pp. 671–676, particularly FIG. 3), a publication issued in 1974.

Next, the invention has the remarkable technical effects described below. Unlike any conventional numerically controlled system which gives operating commands by way of a paper tape, the present invention, dispensing with the use of any paper tape, makes possible direct entry of data from the operating unit 66 into the memory unit 68 on the basis of indications on the display unit 65, and thereby helps save the time otherwise required for preparation of paper tapes. The invention further dispenses with storage of a number of paper tapes and the time required for selection of a relevant one out of the many paper tapes stored. Moreover, scribing, punching and drilling can be achieved irrespective of the height of the surface to be worked on. Therefore in a drilling operation, for instance, it is sufficient to specify only the drilling depth from the surface to be machined, but not the position relative to the base point of the Z axis direction, and the data to be specified can be accordingly simplified. Furthermore, since, in automatic sensing of the surface of the workpiece, detection of the contact of the combined scribing-/punching tool 18 or the drill 21 with the workpiece 44 is detected on the basis of the pressure received from the combined scribing/punching tool 18 or the drill 21 according to the back component of force which the combined scribing/punching tool or the drill receives from the workpiece 44, the workpiece 44 can be formed of an electric insulator material as well as an electric conductor material unlike those systems in which the workpiece 44 and the combined scribing/punching tool or the drill are electrically insulated from each other and electric tension is applied to both in advance so that contact between them could be detected by the flow of an electric current from one to the other. It is also possible to store in advance a number of working patterns in the memory unit 68 and machine the workpiece in accordance with a single pattern or a combination of patterns selected from the stored patterns, and data can be readily entered from the operating unit 66 into the memory unit 68 because a brief diagram of each working pattern and relevant data are represented on the pattern display unit 69. Still another significant feature resides in the fact that, since scribing and punching can be accomplished with a common tool and the combined scribing/punching tool and the drill chuck can be readily interchanged, the operating rate of the system can be correspondingly raised.

What is claimed is:

1. An automatic machining system comprising: a head unit having a combined scribing/punching tool or drill chuck, means for positioning said tool or drill chuck in the direction of the Z axis and a driving unit for rotating said chuck in drilling a workpiece; a sensor which, when subjected to pressure from the tool or drill mounted in said chuck according to the back component of force which said tool or drill receives from said workpiece when the tip of said tool or drill comes into contact with said workpiece, generates an electric signal to detect said contact and senses the variation thereof; a travel distance control unit responsive to a detection signal from said sensor for controling the travel distance of the tool or drill of said head unit in the Z axis direction in accordance with the requirement of the scribing, punching or drilling operation; an X-Y driving unit for moving and positioning said head unit in the respective directions of the X and Y axes to vary the machining position of the head unit; means for securely fixing said workpiece on a work table; a memory unit for memorizing various data; an operating unit which selects one out of the scribing, punching and drilling functions for said head unit, chooses a working pattern and feeds said memory unit with machining data including the X and Y coordinates for moving said head unit and the external dimensions and drilling depth of the workpiece; a display unit on whose screen the picture varies with the working condition of said operating unit and the machining data fed from said operating unit to said memory unit as well as the operating instruction and the kinds of data such as said X and Y coordinates and the radius to be next given as input to said operating unit are indicated; a pattern display unit on which the respective working patterns corresponding to the modes of said scribing, punching and drilling, and all the symbols in which the machining data to be fed from the operating unit to said memory unit are to be indicated are displayed in advance and the working pattern selected by the operating unit is separately indicated as express instruction to an operator; and a control unit for controlling each of the above-mentioned means in accordance with said machining data input from the operating unit to the memory unit.

2. Means usable in an automatic machining system of the numerical control type comprising:
 a head assembly for receiving a tool;
 means for moving said head assembly in three mutually perpendicular directions;
 a work piece holder;
 means responsive to movement of said head assembly towards said work piece for sensing the touch of said tool mounted in the head assembly thereby eliminating the need for providing input data identifying the initial displacement distance between said tool and the work piece or the height of the work piece;
 a chuck and means for selectively moving the chuck towards and away from a work piece, said tool comprising:
 a body having an upper end adapted to be received by said chuck;
 said body having a hollow portion and a bore extending to the body of the tool and communicating with the hollow interior;
 a pin slidably mounted in said bore and at least partially extending into said hollow portion;
 a stop member having an axial bore and a hammer member being slidably mounted in said hollow portion;
 said hollow interior having a tapering side wall portion;
 first bias means urging said stop member outwardly towards said side wall to offset said axial bore relative to said pin whereupon said pin engages said stop member;
 second bias means for urging said pin towards said stop member;
 third bias means engaging said hammer and being compressed and hence charged when the tool body moves towards a work piece as the pin urges the stop member and hammer members towards said third bias means;
 said third bias means being discharged when said stop member moves radially inward against the force of said first means due to sliding engagement with said tapering side wall until said pin and axial bore are aligned to abruptly move the hammer member towards the work piece under control of the charged third bias means.
 said third bias means being discharged when said stop member moves radially inward against the force of said first means due to sliding engagement with said tapering side wall until said pin and axial bore are aligned to abruptly move the hammer member toward the work piece under control of the charged third bias means.

* * * * *